United States Patent
Kim et al.

(10) Patent No.: US 8,050,348 B2
(45) Date of Patent: Nov. 1, 2011

(54) RECEIVER AND METHOD PERFORMING ADAPTIVE OVERLAP AND ADD FUNCTION IN MULTI BAND ORTHOGONAL FREQUENCY DIVISION MULTIPLEXING SCHEME

(75) Inventors: Yun Young Kim, Yongin-si (KR); Jae Ho Roh, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 975 days.

(21) Appl. No.: 11/691,934

(22) Filed: Mar. 27, 2007

(65) Prior Publication Data

US 2008/0107201 A1    May 8, 2008

(30) Foreign Application Priority Data

Nov. 7, 2006    (KR) .................. 10-2006-0109532

(51) Int. Cl.
*H04L 1/02* (2006.01)
(52) U.S. Cl. ........ 375/267; 375/260; 375/316; 375/285; 375/346; 375/349
(58) Field of Classification Search .................. 375/267, 375/260, 316, 285, 346, 349
See application file for complete search history.

(56) References Cited

U.S. PATENT DOCUMENTS

| | | | |
|---|---|---|---|
| 7,068,593 B2 * | 6/2006 | Cho et al. | ................ 370/208 |
| 2004/0047284 A1 | 3/2004 | Eidson | |
| 2005/0107036 A1 * | 5/2005 | Song et al. | ................. 455/23 |
| 2006/0018250 A1 | 1/2006 | Gu et al. | |
| 2006/0067441 A1 * | 3/2006 | Park et al. | ............... 375/346 |
| 2006/0203925 A1 * | 9/2006 | Pirooz et al. | ............. 375/260 |
| 2007/0206689 A1 * | 9/2007 | Koo et al. | ................ 375/260 |
| 2009/0225910 A1 * | 9/2009 | Suzuki et al. | ............ 375/343 |

FOREIGN PATENT DOCUMENTS

| | | |
|---|---|---|
| JP | 11-17643 | 1/1999 |
| KR | 10-0350411 | 8/2002 |
| KR | 2003-6016 | 1/2003 |
| KR | 2005-5991 | 1/2005 |
| KR | 2006-35939 | 4/2006 |
| KR | 2006-73257 | 6/2006 |
| KR | 2006-84524 | 7/2006 |
| WO | WO 2005/002101 | 1/2005 |

* cited by examiner

*Primary Examiner* — Chieh M Fan
*Assistant Examiner* — Siu Lee
(74) *Attorney, Agent, or Firm* — Stein McEwen, LLP

(57) ABSTRACT

A receiver performing an adaptive overlap and add (OLA) function in a multi band orthogonal frequency division multiplexing (OFDM) scheme and a method using the receiver. The receiver performing the OLA function in the multi band OFDM includes a channel estimator to estimate a delay spread from a digital input signal; a signal-to-noise ratio (SNR) estimator to estimate an SNR from the digital input signal; and an overlap and add (OLA) module to determine an OLA length based on the estimated delay spread and the estimated SNR and to perform an OLA according to the determined OLA length, wherein the OLA module adds, to header samples of an OFDM symbol, tail samples corresponding to the estimated delay spread of the OFDM symbol corresponding to the digital input signal.

20 Claims, 6 Drawing Sheets

FIG. 5

| SNR[dB] | DELAY SPREAD | | | |
|---|---|---|---|---|
| | L/12 | L/8 | L/4 | L/2 |
| -5 | 0 | 0 | 0 | 0 |
| 0 | L/4 | L/8 | L/8 | 0 |
| 5 | 3L/8 | 3L/8 | L/4 | 5L/8 |
| 10 | 3L/8 | L/2 | L/2 | 7L/8 |
| 15 | L/2 | 5L/8 | 3L/4 | L |
| 20 | L/2 | 3L/4 | L | L |

L : MULTI PATH CHANNEL IMPULSE RESPONSE LENGTH

RECEIVER AND METHOD PERFORMING ADAPTIVE OVERLAP AND ADD FUNCTION IN MULTI BAND ORTHOGONAL FREQUENCY DIVISION MULTIPLEXING SCHEME

CROSS-REFERENCE TO RELATED APPLICATIONS

This application claims the benefit of Korean Patent Application No. 2006-109532, filed Nov. 7, 2006, in the Korean Intellectual Property Office, the disclosure of which is incorporated herein by reference.

BACKGROUND OF THE INVENTION

1. Field of the Invention

Aspects of the present invention relate to a multi band orthogonal frequency division multiplexing (OFDM) system and, more particularly, to a receiver performing an adaptive overlap and add (OLA) function in a multi band OFDM scheme which can determine an optimal OLA length, and a method using the receiver.

2. Description of the Related Art

A multi-band orthogonal frequency division multiplexing (OFDM) scheme generally involves an OFDM symbol hopping between frequencies among a plurality of frequency bands every predetermined symbol unit and transmitting a signal. OFDM is also used in certain wireless communication systems, such as an ultra wideband (UWB) system.

In the multi band OFDM system, a delay spread occurs in a tail of the OFDM symbol when an OFDM symbol including 128 subcarriers is received. There are as many occurrences of a loss of a header of the OFDM symbol as there are occurrences of the delay spread in the tail of the OFDM symbol. Zero padding a cyclic prefix (CP) section of the OFDM symbol has been used to prevent the loss of the header of the OFDM symbol due to the delay spread in the tail of the OFDM symbol.

The method of zero padding creates a predetermined section by zero padding a section length where the delay spread occurs in a tail of the 128 valid samples, including data in a transmission end, as required. In this case, the method of zero padding may recover the loss of the header of the OFDM symbol by adding the tail of the OFDM symbol where the delay spread occurs to the header of the OFDM symbol.

In a multi band OFDM system according to the conventional art, when there is no noise in the CP section, the OFDM symbol may be recovered when the overlap and add (OLA) length is greater than or equal to the delay spread length in an opposite position. If the OLA length is less than the delay spread length, performing an OLA operation may result in added noise. In addition, when the OLA length is less than the delay spread length, the OFDM symbol may not be completely recovered, causing an inter-carrier interference (ICI) and a decreased signal-to-noise ratio (SNR).

SUMMARY OF THE INVENTION

An aspect of the present invention provides a receiver and a method of performing an adaptive overlap and add (OLA) function in a multi band orthogonal frequency division multiplexing (OFDM) scheme which can determine an optimal OLA length according to a delay spread and a signal-to-noise ratio (SNR) of a received signal, having been measured in order to determine the optimal OLA length.

According to an aspect of the present invention, there is provided a receiver performing an OLA function in a multi-band OFDM, the receiver comprising a channel estimator to estimate a delay spread from a digital input signal; a signal-to-noise ratio (SNR) estimator to estimate an SNR from the digital input signal; and an overlap and add (OLA) module to determine an OLA length based on the estimated delay spread and the estimated SNR, and to perform an OLA operation on the digital input signal according to the determined OLA length, wherein the OLA module adds, to header samples of an OFDM symbol, tail samples corresponding to the estimated delay spread of an OFDM symbol in the digital input signal.

According to another aspect of the present invention, there is provided a method of performing an OLA in a multi band OFDM scheme comprising estimating a delay spread from a digital input signal; estimating an SNR from the digital input signal; determining an OLA length based on the estimated delay spread and the estimated SNR; and performing an OLA operation according to the determined OLA length by adding, to header samples of an OFDM symbol, tail samples corresponding to the estimated delay spread of an OFDM symbol in the digital input signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a table illustrating optimal OLA lengths which varies depending on an SNR and a delay spread according to an embodiment of the present invention.

DETAILED DESCRIPTION OF THE EMBODIMENTS

Figure 1:
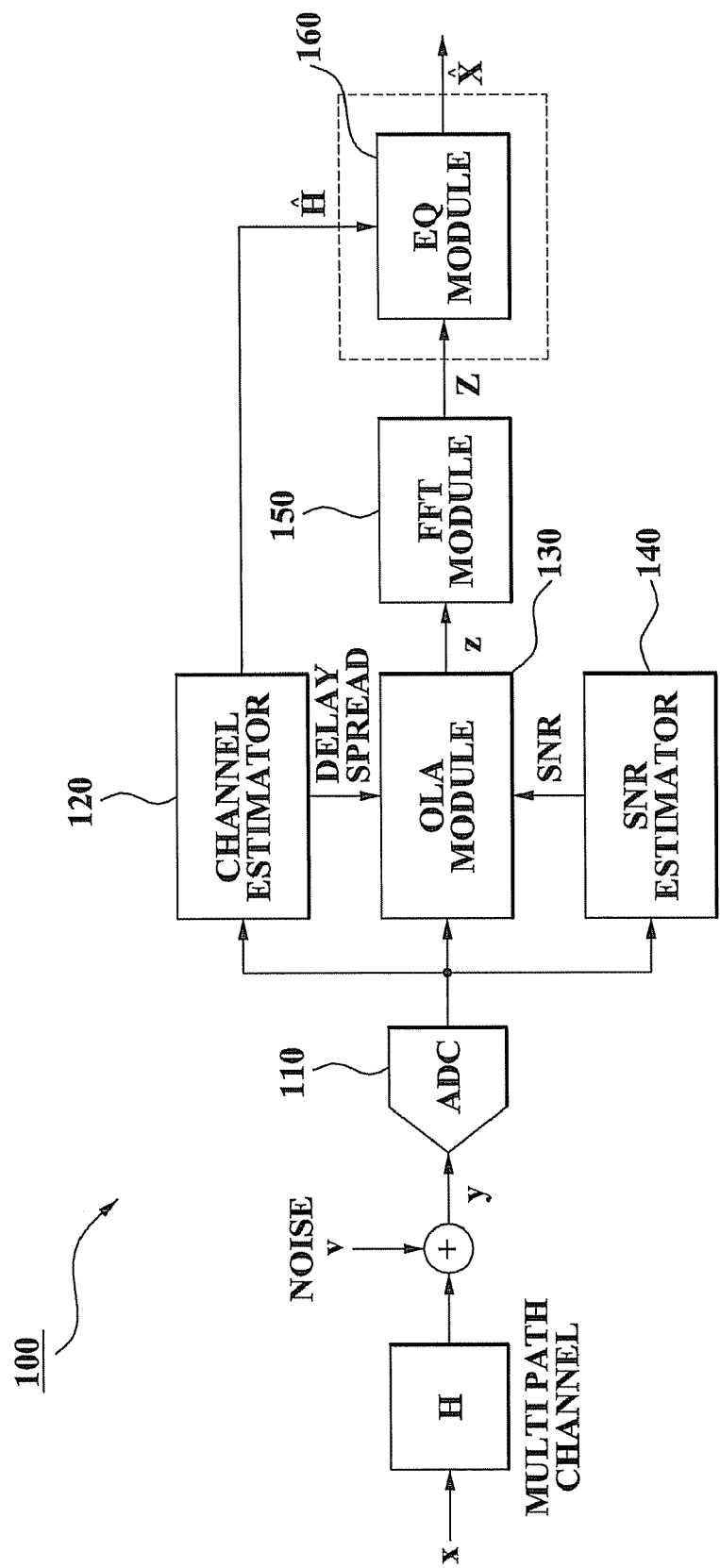
FIG. 1 is a configuration diagram illustrating a receiver performing an overlap and add (OLA) function in a multi band orthogonal frequency division multiplexing (OFDM) scheme according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a receiver 100 performing an overlap and add (OLA) operation in a multi band orthogonal frequency division multiplexing (OFDM) scheme according to an embodiment of the present invention. The receiver 100 performing the OLA operation in the multi-band OFDM scheme may include an analog to digital converter (ADC) 110, a channel estimator 120, an OLA module 130, a signal-to-ratio (SNR) estimator 140, a fast Fourier transform (FFT) module 150, and an equalization (EQ) module 160. The receiver 100 according to other aspects of the present invention may include additional components. Similarly, the functionality of two or more components may be combined into a single unit. The receiver may be incorporated into any device able to receive data using OFDM, such as a mobile telephone, personal digital assistant (PDA), or mobile entertainment device.

The ADC 110 receives a radio frequency (RF) signal, samples the received RF signal, and converts the sampled RF signal into a digital input signal at a frequency greater than approximately 528 MHz. The channel estimator 120 estimates a delay spread from the digital input signal. The SNR estimator 140 estimates a signal distortion from the digital input signal. In addition, the channel estimator 120 may estimate the signal distortion from the digital input signal. The OLA module 130 determines an optimal OLA length based on the estimated delay spread and the estimated SNR and performs the determined OLA according to the optimal OLA length. The FFT module 150 transform signals into a frequency domain by performing a fast Fourier transform (FFT) with respect to the signals outputted from the OLA module 140. The EQ module 160 compensates for the signals outputted from the FFT module 150 based on the estimated signal distortion.

Figure 2:
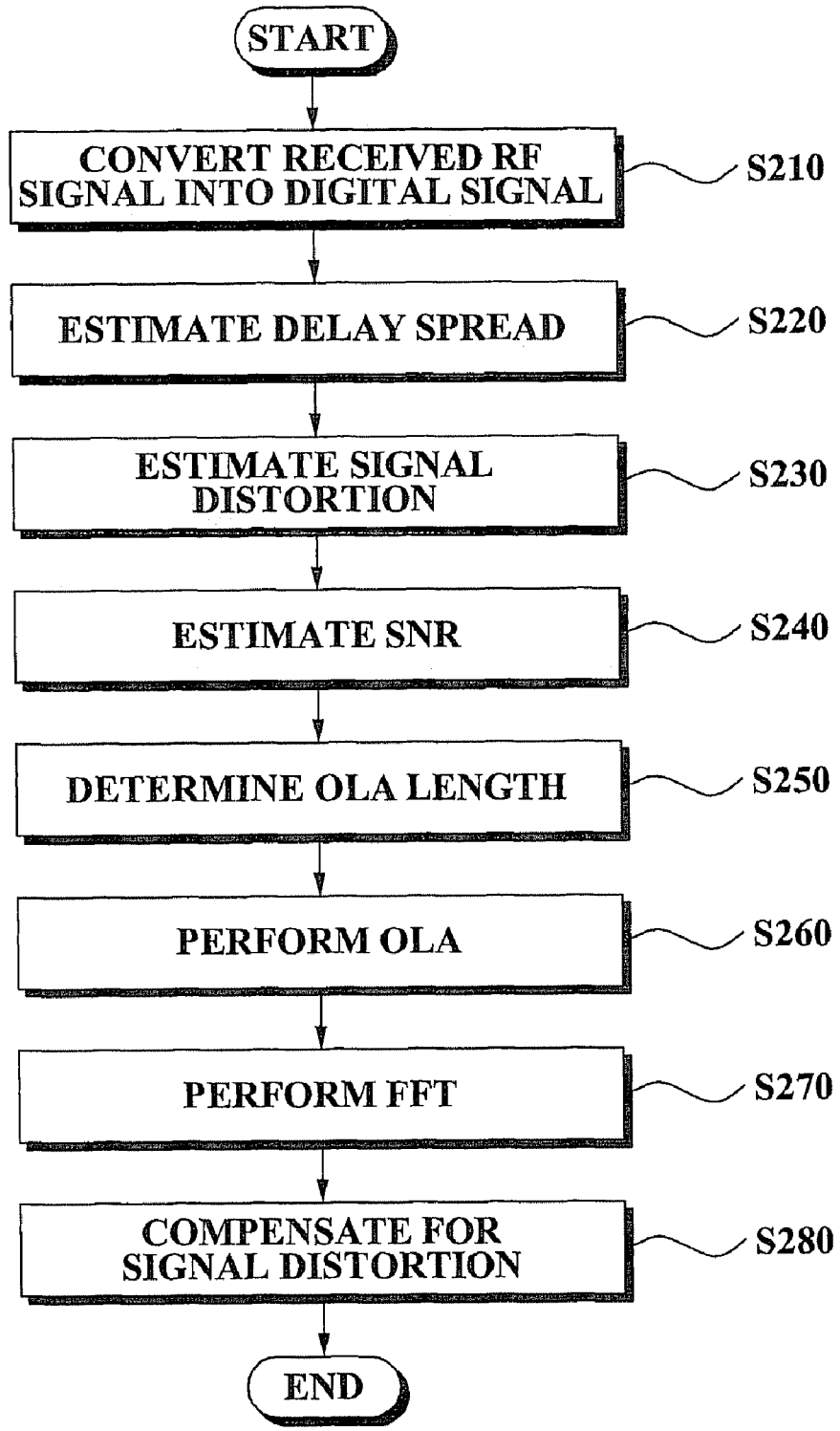
FIG. 2 is a flowchart illustrating a method of performing an OLA operation in a multi band OFDM scheme according to an embodiment of the present invention.

FIG. 2 is a flowchart illustrating a method of performing an OLA function in a multi band OFDM scheme according to an embodiment of the present invention. The technique of performing the OLA operation in the multi band OFDM scheme may include operations S210 converting a received RF signal into a digital signal, S220 estimating a delay spread, S230 estimating a signal distortion, S240 estimating an SNR, S250 determining an OLA length, S260 performing an OLA operation using the OLA length, S270 performing a FFT, and S280 compensating for a signal distortion.

Initially, a transmission end performs zero padding with respect to a predetermined section, e.g. as much as an 'L' length in a cyclic prefix (CP) section, and transmits a signal by zero padding the 'L' length, which may be represented as Equation 1.

$$x = [W_N W_O]^H X \quad \text{[Equation 1]}$$

In Equation 1, 'X' indicates an N×1 matrix which corresponds to an OFDM symbol in a frequency domain, particularly, the OFDM symbol to be transmitted, '$W_N$' indicates an N×N FFT matrix, and the '$W_o$' indicates an N×L zero matrix. $[W_N W_O]^H$ indicates a Hermitian computation. The transmission end generates a transmission signal x which has a length of 'N+L=M' in a time area by performing as much of the zero padding with respect to an inverse fast Fourier transform (IFFT) output signal as the length of 'L'.

A received RF signal y, having been passed through a multi path channel in a receiving end, may be represented by Equation 2.

$$y_n = \sum_{k=0}^{N-1} x_k h_{n-k} + v_n, n = 0, \ldots, M-1 \quad \text{[Equation 2]}$$

In Equation 2, '$v_n$' indicates an additive white Gaussian noise (AWGN) sample and '$h_{n-k}$' indicates a channel impulse response.

In operation S210, the ADC 110 receives the RF signal y, samples the received RF signal, and converts the sampled RF signal into a digital input signal in a frequency greater than approximately 528 MHz.

The channel estimator 120 estimates a delay spread from the digital input signal and the SNR estimator 140 estimates an SNR from the digital input signal in operation S240. The channel estimator 130 may also estimate a signal distortion $\hat{H}$ from the digital input signal in operation S230.

The OLA module 130 may determine an optimal OLA length $P_{opt}$ based on the estimated delay spread and the estimated SNR in operation S250, which may be represented by Equation 3.

$$P_{opt} = \max_p \left\{ \left( \left(1 + \frac{P}{N}\right) \Big/ SNR + 1/SIR \right)^{-1} \right\} \quad \text{[Equation 3]}$$

In Equation 3, 'P' indicates a length corresponding to a zero padding section, and 'N' indicates a length corresponding to a FFT section. SIR is the signal-to-interference ratio. The optimal OLA length $P_{opt}$ is determined so that a signal to interference plus noise ratio (SINR) has a maximum value, represented as $$SINR = \left( \left(1 + \frac{P}{N}\right) \Big/ SNR + 1/SIR \right)^{-1},$$

in an entire FFT section. The SINR, which changes depending on the SNR and the OLA length in a multi channel environment, will be described by referring to FIGS. 3 and 4.

Figure 3:
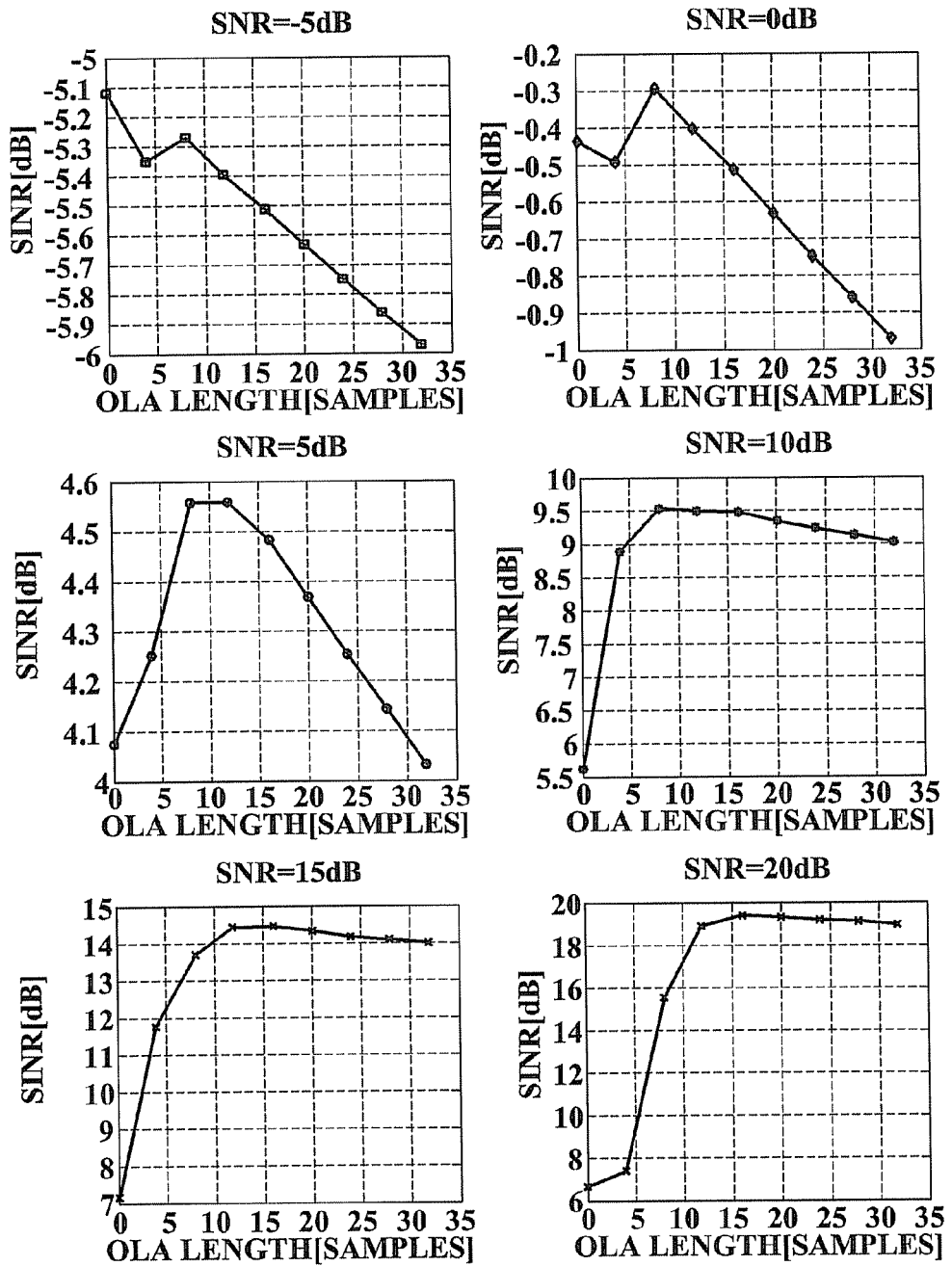
FIG. 3 are graphs illustrating signal-to-interference plus noise ratios (SINRs) which change depending on an SNR and an OLA length according to an embodiment of the present invention.
Figure 4:
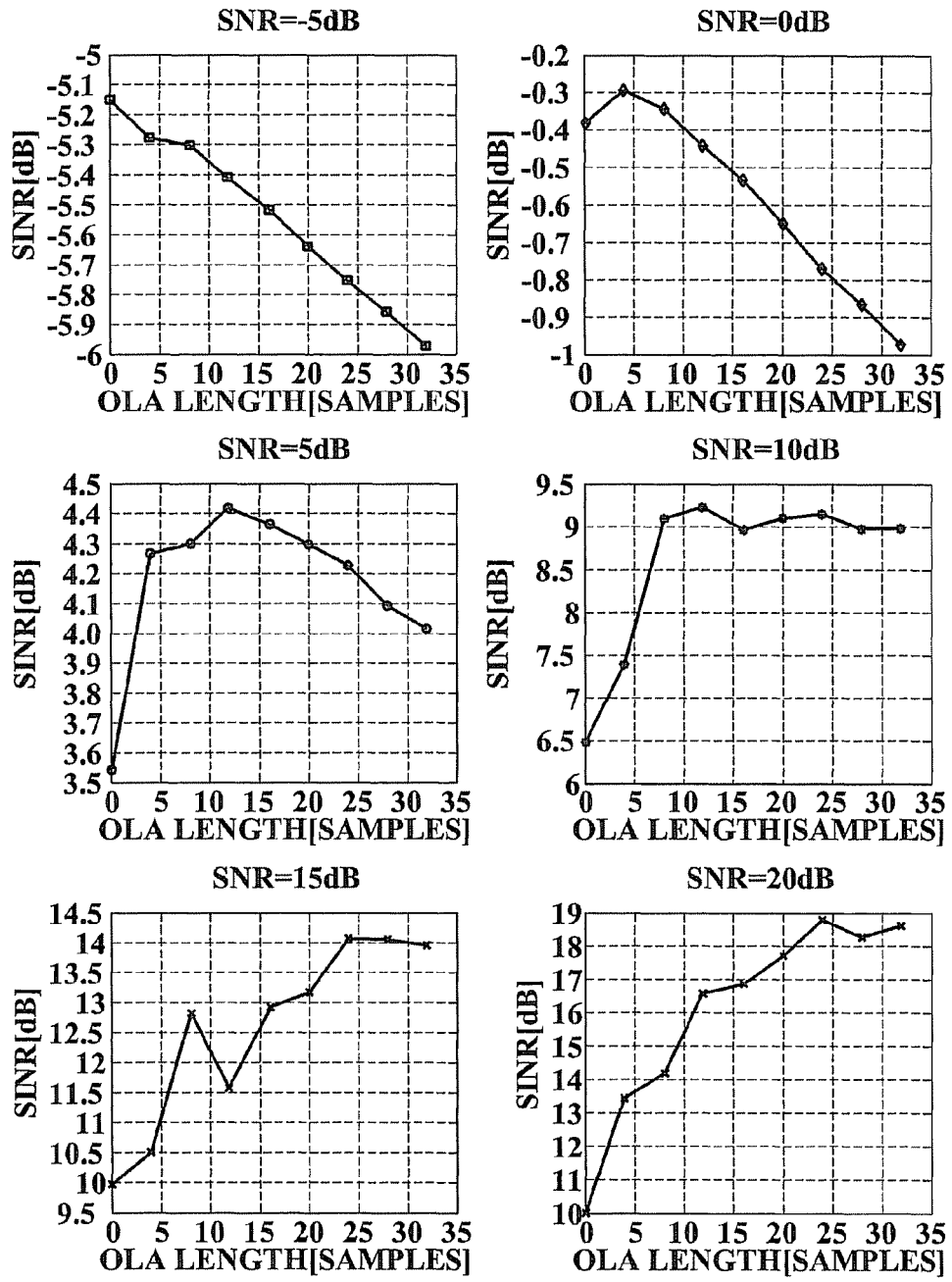
FIG. 4 are graphs illustrating signal-to-noise ratios (SNRs) which change depending on an SINR and an OLA length according to an embodiment of the present invention.

FIGS. 3 and 4 are graphs illustrating SINR which changes depending on an SNR and an OLA length according to an embodiment of the present invention. As illustrated in FIGS. 3 and 4, the SINR according to an SNR and an OLA length in a line-of-sight (LOS) channel and a non-LOS (NLOS) channel have a different delay spread from each other. Namely, a different optimal OLA length occurs according to the SNR values, regardless of a channel type.

For example, as shown in FIG. 3, when the SNR value is less than 0 dB and the OLA operation is performed, the SINR decreases more and the OLA length should be '0'. Conversely, the SNR increases more when the SNR is greater than 0 dB, allowing establishment of an optimal OLA length.

Similarly, in FIG. 4, when the SNR is less than 0 dB and the OLA operation is performed, the SINR decreases more and the OLA length should be established as '0'. When the SNR is greater than 0 dB, the SNR increases more, allowing establishment of an optimal OLA length.

Different optimal lengths according to the delay spread and the SNR will be described with reference to FIG. 5. FIG. 5 is a table illustrating optimal OLA lengths varying depending on an SNR and a delay spread according to an embodiment of the present invention. The optimal lengths depending on the delay spread and the SNR are illustrated in FIG. 5, which may be obtained by Equation 3 using the estimated delay spread and the estimated SNR descriptions shown in FIG. 3. Namely, the OLA length is within a range of 32 samples of a CP where the delay spread occurs, and should increase as the estimated delay spread and the estimated SNR increase.

Figure 6:
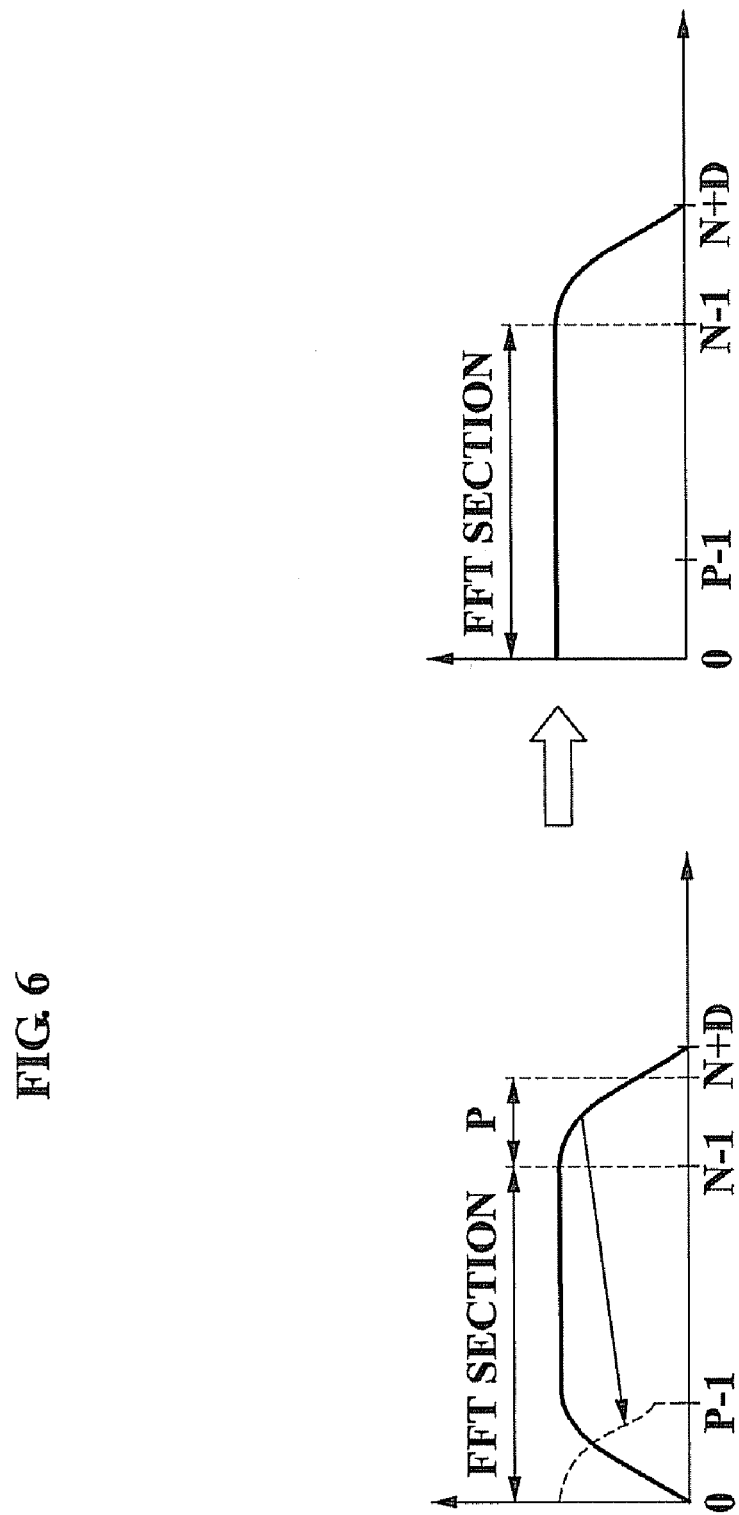
FIG. 6 is a graph illustrating operation of performing an OLA according to an embodiment of the present invention.

The OLA module 130 may perform the OLA operation according to the determined optimal OLA length in operation S260 of FIG. 2. FIG. 6 is a graph illustrating an OLA operation based on the optimal OLA length according to an embodiment of the present invention.

An OLA module 130 of FIG. 1 may overlap and add an optimal OLA length 'P', among a tail sample section D+1 corresponding to an estimated delay spread section from N−1 to N+D of an OFDM symbol, to header samples of the OFDM symbol, i.e., 128 valid samples, the OFDM symbol corresponding to a digital input signal.

Output signals $z_n$, i.e., a result of performing the OLA with respect to a signal corresponding to a FFT section of a length 'N' and a signal corresponding to a zero padding section of a length 'P', may be represented as Equation 4.

$$z_n = \begin{cases} y_n + y_{n+N}, n = 0, \ldots, P-1 \\ y_n, n = P, \ldots, N-1 \end{cases} \quad \text{[Equation 4]}$$

The FFT module 150 of FIG. 1 transforms the outputted signals into a frequency domain in operation S270 of FIG. 2 and outputs a transformed signal Z. The EQ module 160 of FIG. 1 may compensate for the signals outputted from the FFT module 150 in operation S280 and may output a compensated signal $\hat{X}$. Namely, the EQ module 160 receives an estimated signal distortion from the channel estimator 120 of FIG. 1 and compensates for the signals outputted from the FFT module 150 based on the received signal distortion.

The method of performing the OLA in the multi band OFDM scheme according to the above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, there is a receiver and a method of performing an OLA function in a multi band OFDM scheme which can determine an optimal OLA length according to a delay spread and an SNR of a received signal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A receiver in a multi band orthogonal frequency division multiplexing (OFDM) scheme, the receiver comprising:
a channel estimator to estimate a delay spread from a digital input signal;
a signal-to-noise ratio (SNR) estimator to estimate an SNR from the digital input signal; and
an overlap and add (OLA) module to directly receive the estimated delay spread and to directly receive the estimated SNR to determine an OLA length and to perform an OLA operation on the digital input signal according to the determined OLA length,
wherein the OLA module adds, to header samples of an OFDM symbol, tail samples corresponding to the estimated delay spread of the OFDM symbol in the digital input signal.

2. The receiver of claim 1, wherein the OLA length is within a range of 32 samples of a cyclic prefix (CP) where the delay spread occurs and increases as the estimated delay spread and the estimated SNR increase.

3. The receiver of claim 1, further comprising:
an analog to digital converter (ADC) to sample a received radio frequency (RF) signal and to convert the sampled RF signal into the digital input signal.

4. The receiver of claim 1, wherein the tail samples corresponding to the estimated delay spread is within a range of 32 samples of a CP where the delay spread occurs and are added to 128 valid header samples of the OFDM symbol.

5. The receiver of claim 1, wherein the OLA length is determined by $$P_{opt} = \max_P \left\{ \left( \left(1 + \frac{P}{N}\right) / SNR + 1/SIR \right)^{-1} \right\},$$

where 'P' corresponds to a length of a zero padding section, 'N' corresponds to a length of a fast Fourier transform (FFT) section, and 'SIR' is a signal-to-interference ratio.

6. The receiver of claim 1, further comprising:
an FFT module to transform signals outputted from the OLA module into a frequency domain; and
an equalization (EQ) module to compensate for the signals outputted from the FFT module.

7. The receiver of claim 6, wherein:
the channel estimator further comprises estimating a signal distortion from the digital input signal; and
the EQ module compensates for the signals outputted from the FFT module using the estimated signal distortion.

8. The receiver of claim 1, wherein the receiver is part of a mobile device.

9. The apparatus of claim 1, wherein the OLA module determines the OLA length to be zero if the estimated signal-to-noise ratio is less than or equal to zero decibels.

10. A method of performing an overlap and add (OLA) operation in a multi band OFDM scheme, the method comprising:
estimating a delay spread from a digital input signal;
estimating an signal-to-noise ratio (SNR) from the digital input signal;
directly receiving the estimated delay spread and the received estimated SNR in a module;
determining within the module an OLA length from the received estimated delay spread and from the received estimated SNR; and
performing an OLA operation according to the determined OLA length by adding, to header samples of an OFDM symbol, tail samples corresponding to the estimated delay spread of the OFDM symbol in the digital input signal.

11. The method of claim 10, wherein the OLA length is within a range of 32 samples of a CP where the delay spread occurs and increases as the estimated delay spread and the estimated SNR increase.

12. The method of claim 10, further comprising:
sampling a received RF signal; and
converting the sampled RF signal into the digital input signal.

13. The method of claim 10, wherein the tail samples corresponding to the estimated delay spread is within a range of 32 samples of the CP where the delay spread occurs and are added to 128 valid header samples of the OFDM symbol.

14. The method of claim 10, wherein the OLA length is determined by $$P_{opt} = \max_{P} \left\{ \left( \left(1 + \frac{P}{N}\right) \Big/ SNR + 1/SIR \right)^{-1} \right\},$$

where 'P' corresponds to a length of a zero padding section, 'N' corresponds to a length of an FFT section, and 'SIR' corresponds to a signal-to-interference ratio.

15. The method of claim 10, further comprising:
transforming outputted signals into a frequency domain after the performing of the OLA; and
compensating for the signals, having been transformed into the frequency domain.

16. The method of claim 15, further comprising:
estimating a signal distortion from the digital input signal, wherein the compensating for the signals compensates for the signals transformed into the frequency domain using the estimated signal distortion.

17. The method of claim 10, wherein the determining the OLA length comprises determining the OLA length as zero if the estimated signal-to-noise ratio is less than or equal to zero decibels.

18. A non-transitory storage medium storing a program for implementing a method of performing an overlap and add (OLA) in a multi band OFDM scheme, the method comprising:
estimating a delay spread from a digital input signal; estimating a signal-to-noise ratio (SNR) from the digital input signal;
determining within a module an OLA length from the directly received estimated delay spread and from the directly received estimated SNR received at the module; and
performing an OLA operation on the digital input signal according to the determined OLA length by adding, to header samples of an OFDM symbol, tail samples corresponding to the estimated delay spread of the OFDM symbol in the digital input signal.

19. A method of determining an optimal overlap and add (OLA) length for use in an OFDM scheme, the method comprising
directly receiving a delay spread and directly receiving a signal-to-noise ratio in a module;
determining within the module an optimal OLA length from the received delay spread and from the received signal-to-noise ratio;
performing an OLA operation on a received signal based on the optimal OLA length.

20. The method of claim 19, wherein the optimal OLA length is determined by $$P_{opt} = \max_{P} \left\{ \left( \left(1 + \frac{P}{N}\right) \Big/ SNR + 1/SIR \right)^{-1} \right\};$$

where P is a length of a zero padding section, N is a length of a fast Fourier transform section, SNR is the signal-to-noise ratio, and SIR is a signal-to-interference ratio.

* * * * *